United States Patent [19]

Huvey et al.

[11] Patent Number: 5,605,507

[45] Date of Patent: Feb. 25, 1997

[54] MECHANICAL LINKING DEVICE MADE OF WOUND FIBER-REINFORCED RESIN MANUFACTURING PROCESS

[75] Inventors: Michel Huvey, Bougival; Francois Grosjean, Versailles; Lucien Montabord, Sartrouville; Roland Bernollin, Lamastre, all of France

[73] Assignee: Institut Francais du Petrole, Rueil Malmaison, France

[21] Appl. No.: 252,992

[22] Filed: Jun. 2, 1994

[30] Foreign Application Priority Data

Jun. 2, 1993 [FR] France ................... 93 06686

[51] Int. Cl.⁶ ................... F16C 3/00
[52] U.S. Cl. ................... 464/181; 464/183
[58] Field of Search ................... 464/179, 181, 464/182, 183, 903

[56] References Cited

U.S. PATENT DOCUMENTS

| | | | |
|---|---|---|---|
| 4,248,062 | 2/1981 | McLain et al. | 464/181 |
| 4,605,385 | 8/1986 | Pück et al. | 464/183 X |
| 4,681,556 | 7/1987 | Palmer | 464/183 X |
| 4,704,918 | 11/1987 | Orkin et al. | 464/183 X |
| 4,773,891 | 9/1988 | Hoffmann | 464/183 X |
| 4,838,833 | 6/1989 | Coursin | 464/183 X |
| 4,973,372 | 11/1990 | Ditlinger | 464/903 X |
| 5,397,272 | 3/1995 | Smiley et al. | 464/183 X |

FOREIGN PATENT DOCUMENTS

| | | |
|---|---|---|
| 0122033 | 10/1984 | European Pat. Off. |
| 2602458 | 2/1984 | France |
| 3321349 | 12/1984 | Germany |
| 40-5087118 | 4/1993 | Japan ................... 464/181 |
| 2146097 | 4/1985 | United Kingdom ................... 464/181 |

OTHER PUBLICATIONS

J. B. Tritsch, "Automatisation des Procédés d'Obtention des Pièces en Matériaux Composites," *Composites*, vol. 28, No. 4, Jul. 1988, pp. 74–78.

*Primary Examiner*—Daniel P. Stodola
*Assistant Examiner*—Eileen A. Dunn
*Attorney, Agent, or Firm*—Millen, White, Zelano, & Branigan, P.C.

[57] ABSTRACT

A mechanical linking device connects two elements. The device includes resin-coated fibers wound round a principal axis and forming a loop around at least one hole having an axis substantially orthogonal to the principal axis. The device is made using a process for manufacturing a mechanical part through filament winding around a spindle brought into rotation about an axis. Some of the windings use the axis of rotation as the axis and other windings are about a winding axis different from the axis of rotation.

8 Claims, 4 Drawing Sheets

5,605,507

MECHANICAL LINKING DEVICE MADE OF WOUND FIBER-REINFORCED RESIN MANUFACTURING PROCESS

FIELD OF THE INVENTION

The present invention relates to a mechanical linking device for connecting two elements. The device includes resin-coated reinforcing fibers. The device includes fiber windings round a principal axis and round at least one hole whose axis is preferably close to a direction orthogonal to the principal axis.

BACKGROUND OF THE INVENTION

It is well-known to manufacture mechanical parts through the technique consisting in winding reinforcing wires round a spindle driven into rotation. However, the wires are wound in coils with the axis of rotation of the spindle as the axis. In some prior processes, for manufacturing parts having several winding axes, the spindle is necessarily brought into rotation ground the various axes. The support of the winding spindle is then mechanically complex. On the contrary, our invention notably allows reinforcing wire loops to be obtained without rotating the spindle round the axis of the loops.

SUMMARY OF THE INVENTION

The present invention thus relates to a mechanical linking device for connecting two elements, said device including a principal axis and two joining means for connection with each of said elements, a first joining means including at least one hole adapted for receiving a rod whose axis is substantially orthogonal to said principal axis. The device is adapted for taking mainly tensile stresses between said two elements. The second joining means includes a conical bore coaxial with said principal axis whose narrow neck is located at a greater distance from said first joining means with respect to the base of the cone. The joining means include resin-coated reinforcing fibers, said conical bore mainly consisting of windings round the principal axis and said first means, of loop windings round said hole.

Loop windings round the hole may include a determined number of loops whose strands surrounding the hole may be substantially parallel to one another and of loops whose strands cross.

The first joining means may have the shape of a fork joint whose two flanges include said reinforcing wire loop windings.

The device may include inserts coated in the resin-impregnated wires.

The device may comprise the following stages:

a spindle is rotated round an axis zz', a guide means for guiding at least one fiber is moved in two directions xx' and yy'.

The device also relates to a spindle including a male conical part of axis zz' and at least one rod whose axis is substantially orthogonal to axis zz', and controlling the displacements of the spindle and of the guide means for performing fiber windings in circumferential coils round axis zz' on the conical part of the spindle and in longitudinal loops round said rod.

The guide means may move in a direction parallel to zz', the other direction of displacement being perpendicular thereto.

The spindle may include several rods whose axis is substantially orthogonal to the axis zz'.

The fiber may be resin-impregnated.

The resin may be polymerized on the spindle.

The spindle on which the impregnated fibers are wound may be surrounded by shells giving a regular external shape to said part.

A digital control machine program may control and synchronize said displacements of the guide means and of the spindle, and the mechanical strength of the parts obtained may be predetermined by means of certain program parameters.

BRIEF DESCRIPTION OF THE DRAWINGS

Other features and advantages of the invention will be clear from reading the description hereafter given by way of non limitative examples, with reference to the accompanying drawings in which.

DESCRIPTION OF THE PREFERRED EMBODIMENTS

Figure 1:
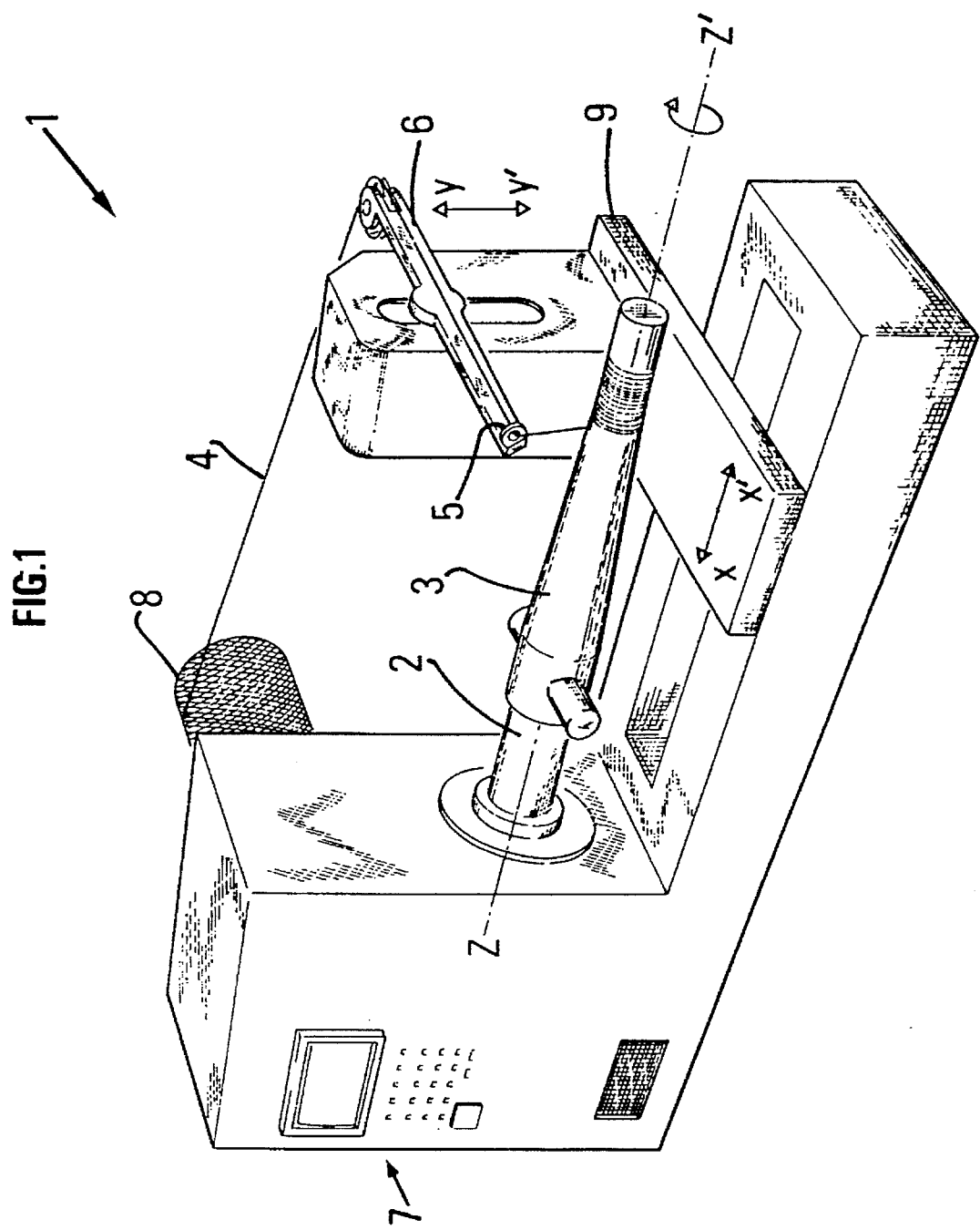
FIG. 1 diagrammatically shows a winding machine.

FIG. 1 shows a winding machine 1 including a rotary shaft 2 on which a spindle 3 used as a support for winding reinforcing wire 4 is fastened. Shaft 2 and spindle 3 are brought into rotation round axis zz'. A guide ring 5 for guiding wire 4 is borne by an arm 6. This arm 6 is borne by a carriage 9 adapted for displacing the ring along an axis xx' parallel to zz'. Arm 6 is adapted for being displaced along an axis yy' which is generally vertical.

The displacement of ring 5 along xx' generates substantially a translation of the point of contact of fiber 4 with a portion of spindle 3.

The displacement along yy' allows the distance of ring 5 to be adapted to the specific shape of spindle 3 and enables thus the wire guidance accuracy on the external shape of the spindle to be optimized.

The winding machine includes digital control means 7 and means for programming the control of the three motions:

rotation of spindle 3 round zz' in both directions, displacement of ring 5 along xx', displacement of ring 5 along yy'.

To achieve the device in accordance with the present invention, the various displacements are controlled according to the external shape of winding spindle 3.

By way of example, the machine used for the tests is a machine manufactured by the ATELIERS DE LA CHAINETTE (ADC) Company, of the "Erode 1" type. This machine is pilot-operated by a digital control rising NUM720 software driving the rotation of the spindle and the horizontal displacement of the setting ring 5. The machine has been modified according to instructions given by the applicant in order to control the third axis yy' corresponding to the descending motion of the ring or setting head with respect to the spindle. The control of this third axis is also achieved through using a digital control program NUM720.

The reinforcing wires are unwound from reel 8. The wires may be preimpregnated with resin, for example according to the processes described in documents U.S. Pat. No. 4,932, 352 or U.S. Pat. No. 5,133,995, (incorporated herein by reference) or dipped in a resin bath (not shown here) located between reel 8 and setting ring 5. When winding is completed, the spindle may also be dipped into the resin.

Figure 2A:
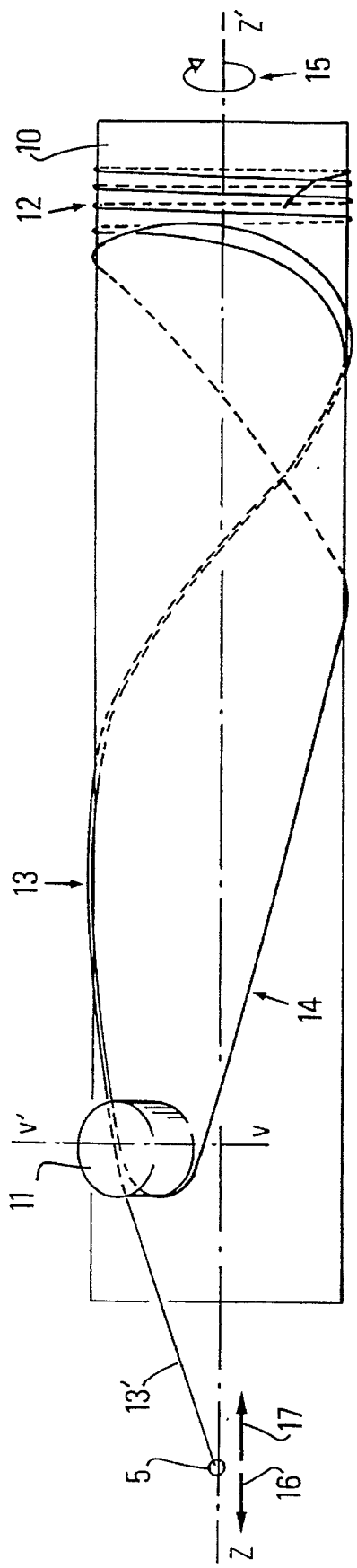
FIGS. 2A and 2B describe the winding principle.
Figure 2B:
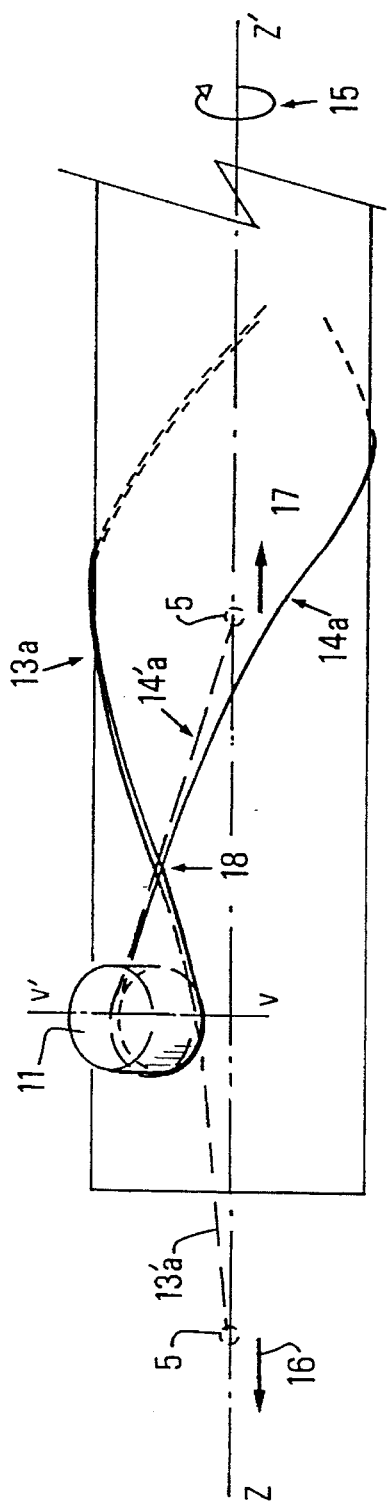

FIGS. 2A and 2B show the principle of a winding example according to the present invention utilizing a spindle of elongated shape and of axis of rotation zz'. The elongated part 10 includes at least one pin 11 whose axis vv' is perpendicular to axis zz'.

Without departing from the scope of the present invention, the section of pin 11 may be other than circular and axis vv' may exhibit a certain angle of inclination with respect to the direction orthogonal to axis zz', for example between 0° and 20°.

The filament windings 12 are obtained by controlling the number of rotations of the spindle according to the length of displacement of the wire setting ring in the direction xx'.

Coil windings making an angle close to 90° with respect to axis zz' are obtained by limiting the displacement xx' per turn of the spindle. These circumferential windings are adapted to the reinforcements in relation to transverse stresses with respect to axis zz'.

Longitudinal coil windings forming a low angle with respect to axis zz' are obtained by increasing the longitudinal displacement xx' per turn. These longitudinal windings are adapted to the reinforcements in relation to the longitudinal stresses along zz'.

The U-shaped loop type around pin 11 is obtained by coordinating the various principal displacements while taking account of the position of the pin with respect to wire 13' set by ring 5. In FIG. 2A, the spindle, and therefore pin 11, rotates in the direction of arrow 15. Wire 13' is set on the spindle through the displacement of ring 5 in the direction shown by arrow 16, so that the wire passes before pin 11 with respect to its motion of rotation. When pin 11 rotates by a certain angle, it bends wire 13' around its external shape. The ring is then moved in the direction of arrow 17 in order to set the wire according to strand 14.

Coordination of the rotation of pin 11 (or of the spindle) and of the displacement of ring 5 thus allows to obtain, on the spindle and around pin 11, a substantially U-shaped reinforcing wire loop whose two strands bear reference numbers 13 and 14. In order to adapt the mechanical strength of the loop to longitudinal stresses (along zz'), the winding of strands 13 and 14 is advantageously achieved according to the lowest possible angles with respect to axis zz'. The specific shape of the spindle may facilitate such a setting of the reinforcing wires.

Repetition of a certain number of loops around pin 11 allows the resistance of the part achieved thereby to be adjusted.

FIG. 2B shows another type of loop around pin 11. Pin 11 rotates in the direction of arrow 15. Ring 5 sets wire 13'a so that it passes behind pin 11 with respect to the rotation of the pin. In order to wind the wire round pin 11, the relative position of ring 5 with respect to the pin is modified, so that the wire is set according to 14'a. To that effect, the control reverses the direction of rotation of the spindle in order to make a portion of a turn while synchronizing a displacement of the ring in the direction of arrow 17. The spindle is then again brought into rotation in the direction of arrow 15 and the ring in the direction of arrow 17 so as to set the wire according to strand 14a.

FIG. 2B thus illustrates the achievement of a wire loop around pin 11 whose strands 13a and 14a cross at point 18.

In each of the embodiments for achieving U-shaped or crossed loops, the displacement of ring 5 along yy' allows the wires to be precisely positioned around pin 11 by adjusting the distance between the ring and the spindle of axis zz', in view of the position of pin 11.

Complete wire turns may also be achieved around pin 11 by moving ring 5 in the direction of arrow 16 after the wires have been set thereby according to 14'a. The wires are then parallel to the direction 13'a after making a complete mm around pin 11. The winding cycle may be continued as described in FIG. 2B.

It appears therefore that, with a filament winding machine such as that described in FIG. 1, circumferential windings and loops may be continuously achieved around a pin which is substantially orthogonal to the axis of rotation of the spindle. The loops may be U-shaped, crossed or execute a complete turn around the pin. A part may be automatically wound on a spindle by programming the digital control.

Figure 3A:
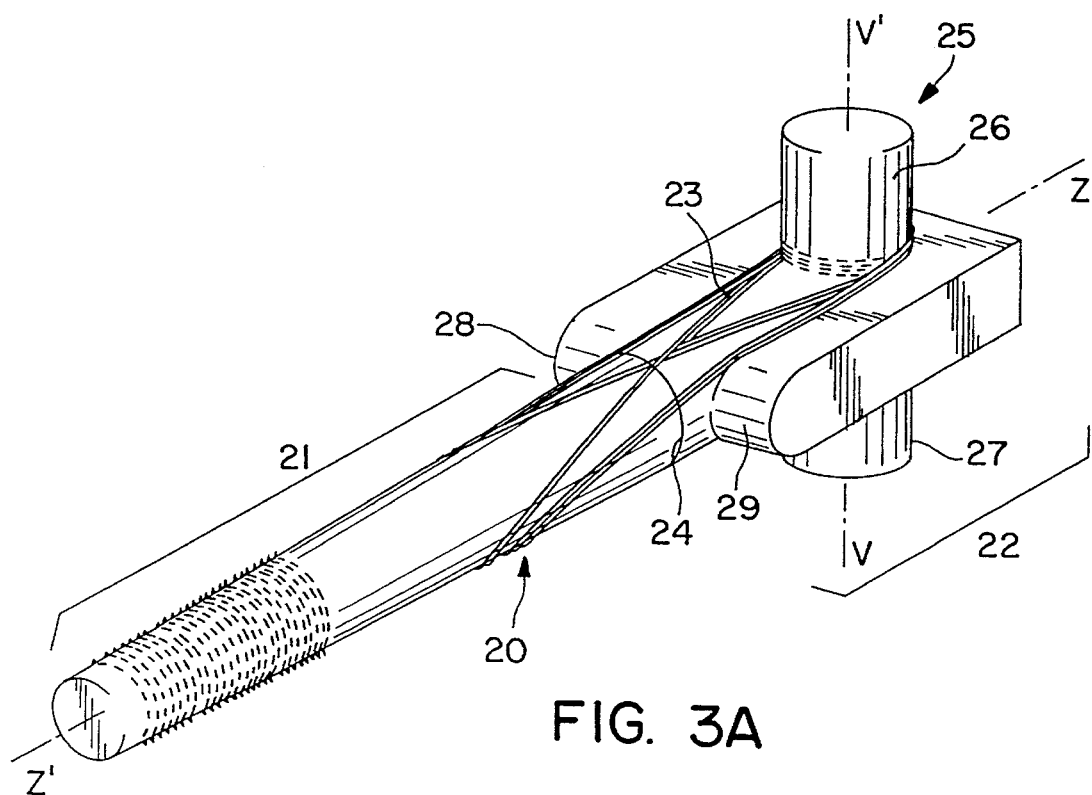
FIG. 3A illustrates a spindle shape according to a preferred embodiment.

FIG. 3A shows a perspective of a partly wound spindle. Spindle 20 exhibits an elongated shape along the principal axis zz'. This spindle is mounted on machine 1 to be driven into rotation around axis zz'.

Spindle 20 consists of a part 21 and of a part 22. These two parts correspond to the manufacturing through winding of a mechanical linking device for connecting two elements. In this example, the joining means corresponding to the windings of part 21 of the spindle is a female cone allowing fastening onto a cable, retaining ring or rod. The other joining means, corresponding to the windings of the bops on part 22 of the spindle, has substantially the shape of a fork joint.

Part 21 of the spindle is truncated-cone-shaped and its base 24 is located close to part 22, the narrow neck of the cone being then located on the opposite side. The angle of the cone is low and generally less than 10°.

The base 24 of the cone is continued by a cylindrical part 23 with axis zz' as the axis, the diameter of the cylinder being at least equal to the diameter of base 24.

A detachable shaft 25 passes through the cylindrical part 23 through a bore whose axis vv' is perpendicular to zz'. Shaft 25 constitutes the pins 26 and 27 on which the reinforcing wire loops are wound.

Two shoulders 28 and 29, metrical with respect to zz', substantially orthogonal to axis vv' and arranged along the cylindrical part 23, provide the fork joint manufactured by winding with precise dimensions between the two flanges and guide the reinforcing wires in traction according to a plane substantially parallel to axis zz'.

The winding programming distributes the setting geometry and the number of wires according to the mechanical stresses on the linking device. The longitudinal stresses entail tensile stresses on the flanges of the fork joint and bursting stresses at the level of the cone where the cable is embedded. The winding program must distribute the number of cross fibers and of longitudinal fibers, especially at the level of the loops.

One advantage of the invention is to allow the manufacturing of the device to be easily optimized by modifying certain parameters of the winding program. The manufacturing times and the amount of material used may be directly related to the mechanical strength desired for the device.

When the spindle is entirely wound, and the fibers are impregnated with resin, polymerization is performed according to the conventional techniques adapted to the resin type.

When polymerization is completed, shaft 25 and the spindle are removed.

Figure 3B:
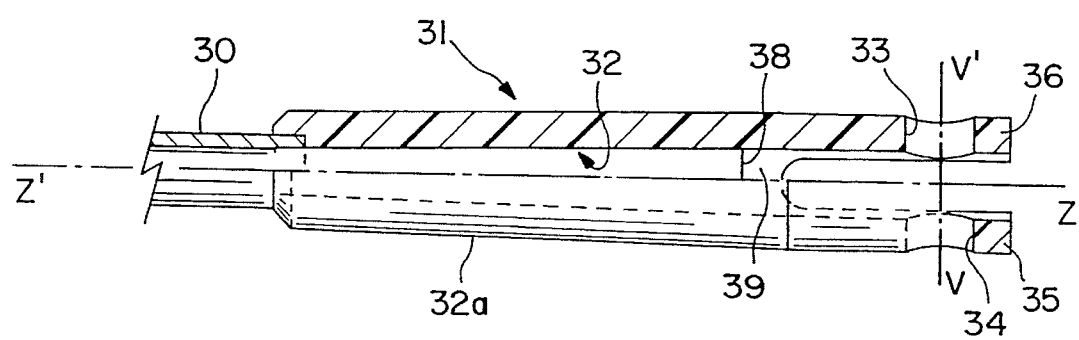
FIG. 3B is a section of the device achieved by means of the spindle.

FIG. 3B is a section of the device 31 manufactured according to the process of the present invention by winding on the spindle shown in FIG. 3A. A sheath 30 made from a supple material may be fastened on the device by winding during manufacturing. This sheath is notably a protection for the cable anchored in the female conical part 32 of device 31. The anchoring mode of the cable will not be described hem since it is well-known in the art. The other joining means of device 31 is a fork joint consisting of flanges 35 and 36, including, along axis vv', holes 33 and 34 adapted for receiving a fastening pin.

Figure 3C:
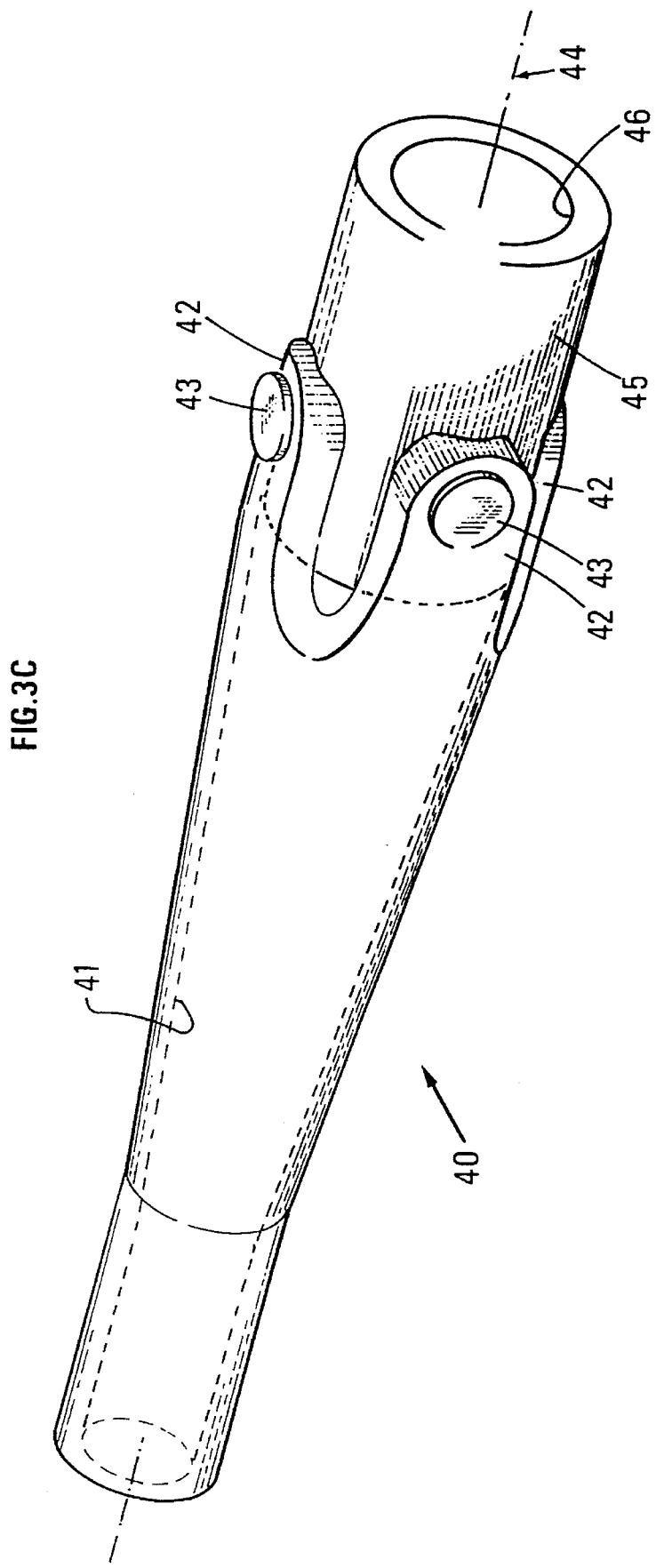
FIG. 3C shows a perspective of a variant of the device.

FIG. 3C shows a perspective of a variant 40 of the device. Like device 31 shown in FIG. 3B, it includes a female conical part manufactured by winding according to the present invention. The other joining means includes several flanges 42 also manufactured by winding (four are distributed on the circumference). Rods 43 pass through the holes of said flanges. These rods are preferably substantially perpendicular to the principal axis 44. A part 45 of cylindrical shape penetrates between flanges 42 and is assembled onto said other joining means through the cooperation of flanges 42 and of rods 43.

Parts 45 and rods 43 may be part of the winding spindle of deface 40 or be a metallic insert integral with the device. In this case, bore 46 must allow the cable to be anchored in the female cone 41. Part 45 may for example include a thread (not shown) for connection onto another parts.

The fibers used may be glass, carbon or aramid. By way of example, it is possible to use glass fibers such as OCF ECR 2400 TEX® manufactured by the Owens Corning Fiberglass Company, impregnated with epoxy resin mixed with reagents, for example Epon 828 (100 parts by weight), with hardener Nadic Methyl Anhydride (NMA) (90 parts by weight) and with accelerator Benzyl DiMethyl Amine (BDMA) (2 parts by weight), manufactured by the SHELL Company.

The thermosetting resin is not necessarily an epoxy resin. It may be a polyester, a vinylester, a melamine-formaldehyde or a phenol-formaldehyde resin.

Prepregs based on thermoplastic resin such as Polypropylene, Polyethylene, Polyamide may also be used, the winding requiring then a device for melting the polymer on the point of setting of the fibers on the spindle.

Polyaramid fibers may also be used, such as, for example, KEVLAR 49® fibers which are polyaramid fibers manufactured by Dupont de Nemours. These fibers may be coated with SBS or block copolymer Styrene Butadiene Styrene in solution in ethylene trichloride. The SBS used may be KRATON manufactured by Shell Chimie.

The materials used are chosen according to the mechanical and chemical properties sought for the de, ice in accordance with the invention, and according to economic criteria.

It must be pointed out that the device and the mechanical parts manufactured according to the invention have the advantage of not being subject to corrosion as metallic parts may be, notably in a saline or in a weakly acid environment.

Furthermore, the mechanical linking devices are subject to fatigue. It appears that the composite material manufactured from resin-coated reinforcing fibers has a high fatigue strength compared to common metal alloys, notably in the case of preimpregnated fibers.

Tests which have been carded out show that linking devices such as that shown in FIG. 3B, one being made from aluminum alloy and the other from glass fiber-reinforced resin according to the present invention, show comparable mechanical performances for equally comparable external dimensions.

The manufacturing method according to the invention allows the manufacturing automation to be optimized since it essentially utilizes a digital control machine.

Of course, the present invention is not limited to parts according to FIG. 3B. The linking device may include several fork joints. Similarly, the two joining means may have the shape of a fork joint, or one may consist of an inserted threaded part fastened through the wire coils.

In another variant, metallic or non metallic resorts may be wound during manufacturing, for example cylinders coaxial to pins 11.

In summary and in further characterization of the mechanical linking device from the present invention, FIG. 3B, shows a mechanical linking device 31 formed about a principle axis Z—Z' for connecting a first element, wherein the first element is connected to a second element which is received in a bore such as the bore 32 of FIG. 3B or the bore 41 of FIG. 3C, extending through the device. The bore is aligned with the principle axis Z—Z'. The first end of the device has a fork defined by the legs 35 and 36 of FIG. 3B or the legs 42 of FIG. 3C. The legs are arranged in opposed pairs and have holes 33 and 34 (FIG. 3B) therein which are aligned with a transverse axis V—V' oriented orthogonally with respect to the principle axis Z—Z'. The holes are each adapted to receive at least one of the pins, such as one of the pins 43 of FIG. 3C. The fork formed by the legs 35 and 36 extends from a circular base 38 and has a cylindrical bore 39 extending therethrough in the direction of the principle axis Z—Z'. The second end 32a is unitary with the first end and has a frustoconical bore 32 extending therein and a base which is coextensive with the base 38 of the first end.

As is seen in FIGS. 1, 2A, 2B and 3A, the device 31 is formed by resin coated reinforcing fiber 4 which is looped around the holes 33 and 34 and extends throughout the first and second ends of the device to configure the device as a unitary member comprised of reinforcing fiber and resin (see FIG. 3B and see element 40 of FIG. 3C).

As is seen in FIGS. 2A and 3A, the fiber 4 is wound with only a slight pitch at location 12 of the second end 21 but with a long pitch at location 23 where the legs 35 and 36 (FIG. 3B) are formed.

From the foregoing description, one skilled in the art can easily ascertain the essential characteristics of this invention and, without departing from the spirit and scope thereof, can make various changes and modifications of the invention to adapt it to various usages and conditions.

We claim:

1. A mechanical linking device formed about a principle axis, the device connecting a first element to a second element, wherein the first element is connected to the device by at least one pin and the second element is received in a bore through the device aligned with the principle axis, the device comprising:

a first end having at least one fork defined by two opposed legs, the opposed legs having holes therein aligned with a transverse axis oriented orthogonally with respect to the principal axis, the holes each adapted to receive at least one of the pins, the fork extending from a circular base portion of the first end, the base portion having a cylindrical bore extending therethrough in the direction of the principle axis;

a second end, unitary with the first end, having a base radially coextensive with the base of the first end, the second end extending away from the base of the first end and being substantially frustoconical about the principle axis and having a frustoconical bore tapering away from the base of the second end and extending therein for receiving the second element; and a winding of resin-coated reinforcing fiber looped around the holes in the legs and extending throughout the first and second ends of the device to configure the device as a unitary member comprised of reinforcing fiber and resin.

2. The device of claim 1, wherein the reinforcing fiber is looped around the holes with successive loops having fiber extending substantially parallel to the fiber of previous loops and with fiber of successive loops crossing one another.

3. The device of claim 2, wherein the reinforcing fiber is a continuous strand.

4. The device of claim 3, wherein there are two pairs of opposed legs forming two forks.

5. The device of claim 1, wherein the reinforcing fibers is a continuous strand.

6. The device of claim 5, wherein there are two pairs of opposed legs forming two forks.

7. The device of claim 1, wherein the strand is wound with a slight pitch to form the second end and is looped around the holes with a relatively long pitch with respect to the principal axis to form the forks.

8. The device of claim 1, wherein the frustoconical bore has a taper of less than about 10°.

* * * * *